United States Patent Office 2,949,487
Patented Aug. 16, 1960

2,949,487
METHOD FOR PREPARING POLYCHLOROTHIO-PHENOLS

Albert L. Rocklin, Concord, Calif., assignor to The Dow Chemical Company, Midland, Mich., a corporation of Delaware No Drawing. Filed Oct. 26, 1955, Ser. No. 543,017

19 Claims. (Cl. 260—609)

This invention relates to a method for preparing polychlorothiophenols from corresponding polyhchlorobenzenes and has particular reference to the prepartion of pentachlorothiophenol from hexachlorobenzene.

Penta-substituted thiophenols and various functional derivatives thereof are useful, among other things, as plasticizers and plasticizing agents for a great variety of elastomeric materials including natural and synthetic rubbers and rubber-like polymers and copolymers of butadiene, styrene, acrylonitrile and the like.

Various techniques have been employed for converting polychlorobenzenes to the corresponding polychlorothiophenols including reacting a polychlorobenzene as hexachlorobenzene with an alkaline sulfide in alcoholic solution. This known reaction may not be entirely desirable, however, in that it frequently proceeds at a relatively slow rate and requires relatively elevated temperatures, which must be carefully controlled, for its accomplishment. Further, anhydrous conditions during the reaction are often required for optimum results and, in addition, the reaction product is frequently contaminated with associated by-products such as corresponding phenolic compounds and alcoholic thioethers which tend to form during the reaction. Thus, it is usually found necessary to purify the reaction products from the undesired associated by-products by such tedious operations as recrystallization and the like.

It would be desirable to prepare relatively pure polychlorothiophenols in good yield from corresponding polychlorobenzenes using alkaline sulfide reagents in such a manner that the rate of reaction is relatively rapid over a conveniently broad and easily maintained temperature range without necessarily requiring an anhydrous medium for the reaction.

This may advantageously be accomplished in accordance with the present invention by reacting a polychlorobenzene in a pyridic solution at a temperature between about 75° C. and about 180° C. with an alkaline sulfide dissolved in an aqueous or glycol solution. A polychlorothiophenol product may thus be consistently obtained in good yield with sufficient purity for most purposes to obviate further requirements for purification.

The polychlorobenzene which is converted according to the present invention preferably contains at least five substituent chlorine atoms. Most advantageously, it is hexachlorobenzene although pentachloromonoalkylbenzenes wherein the alkyl group may possess from one to eight carbon atoms may also be employed. The pyridic solvent in which the polychlorobenzene is dissolved for the reaction is advantageously pyridine or a substituted pyridine such as one of the picolines or the lutidines or a mixture of such compounds, excepting that when lutidines are employed they should be open, i.e. satisfied with hydrogen, on either the 2- or 6-position of the pyridine ring. When both these positions are simultaneously blocked in a di-substituted pyridine, such as in 2,6-dimethylpyridine, the material tends to be undesirable as a reaction medium in that it does not seem to be conducive to the desired reaction.

Any suitable alkaline sulfide, including the acid or hydrosulfides, may be employed as the converting reagent in the reaction. It is frequently more advantageous to use the hydrosulfide form. Sulfides and hydrosulfides of alkali metals, particularly sodium and potassium, are most desirably employed. As mentioned, the alkaline sulfide reagent may be dissolved in an aqueous or glycol solution. Solvents selected from the group consisting of water, glycol and saturated dihydroxy alcohols containing between three and six carbon atoms in their molecules may suitably be employed for this purpose. Preferably water is utilized to dissolve the alkaline sulfide reagent. Advantageously, the alkaline sulfide reagent is prepared in situ by dissolving an alkali metal hydroxide in water then converting it to the sulfide by subjecting it to hydrogen sulfide which may be bubbled through the solution for this purpose.

In the reaction, about two moles of the alkaline sulfide are employed for each mole of the polychlorobenzene to be converted in order to replace one of the chlorine atoms on the substituted benzene with a mercapto group. If desired, about one mole of hydrogen sulfide and two moles such as sodium hydroxide may be alternatively employed as reagent for each mole of polychlorobenzene present. Advantageously, about a 10 percent excess over the stoichiometric equivalent amount of the alkaline sulfide reagent is used to insure a more complete conversion of the polychlorobenzene. When less than theoretical amounts of alkaline sulfide reagent is employed there is a correspondingly reduced conversion of the polychlorobenzene present although lower yields are not thereby experienced. Greater excesses of the alkaline sulfide reagent may be employed without affecting the yield or the conversion although unreacted quantities of the alkaline sulfide are thereby encountered. For example, as much as eight moles and more of alkaline sulfide can be present for each mole of polychlorobenzene employed without hampering the method of the present invention.

Any desired concentration of the polychlorobenzene in pyridic solution may be employed although it is convenient to have the pyridic solvent as nearly saturated with the polychlorobenzene as is possible under the conditions of the reaction. For example, when hexachlorobenzene is dissolved in pyridine, about a 20 percent by weight solution may advantageously be employed. About a 25 percent solution can be utilized if the reaction is performed near boiling point of the pyridine. Greater concentrations are possible if pressure is employed to raise the boiling temperature of the solvent.

Generally the amount of alkaline sulfide solvent which is conveniently employed is about one-quarter of the volume of pyridic solvent employed in dissolving the polychlorobenzene. This proportion is not critical, however, and, in certain instances, a smaller or larger comparative volume of solvent for the alkaline sulfide reagent can be employed. It is merely necessary to employ sufficient solvent to dissolve the alkaline sulfide reagent without introducing volumes which are so copious as to unnecessarily encumber subsequent isolation of the polychlorothiophenol product.

As mentioned, temperatures between about 75° C. and 180° C. may advantageously be employed for the reaction. Conveniently, a temperature between about 100° C. and the boiling point of the pyridic solvent is utilized. While the reaction will proceed at temperatures below about 75° C., the rates of reaction under such conditions are frequently impractically slow. Temperatures exceeding the boiling point of the pyridic solvent may advantageously be employed, especially under superatmospheric pressures. However, reaction temperatures much above about 180° C. do not appreciably benefit the reaction and may tend to cause an undesirable decomposition of the product polychlorothiophenols to occur.

When the reaction is completed, the dissolved polychlorothiophenols may be recovered by acidification and filtration of the resulting precipitate after unreacted constituents have been removed by suitable means from the reaction mass to substantially isolate the polychlorothiophenol. For this purpose techniques may be followed which are apparent to those skilled in the art. The pentachlorothiophenols and derivative products such as the tetrachloromonoalkylthiophenols prepared according to the present invention are usually crystalline, colorless compounds having very little odor. While they are insoluble in water and only slightly soluble in ethanol, they are readily soluble in chloroform and in hot aromatic hydrocarbon solvents.

Further features and advantages of the present invention are apparent in the following examples.

Example 1

An alkaline sulfide reagent was prepared by saturating a solution comprised of about 61.8 grams of sodium hydroxide in about 190 ml. of ethylene glycol with hydrogen sulfide. The sulfide reagent was quickly added to a boiling pyridic solution of about 200 grams of hexachlorobenzene dissolved in about 800 ml. of pyridine. The addition was completed in about two minutes after which the reaction mass was additionally boiled for about 15 minutes. A granular precipitate of sodium chloride was formed in the reaction mass.

After cooling, the reaction mass was filtered to remove the sodium chloride. The filtered reaction mass was then diluted with water to a total volume of four liters causing unreacted hexachlorobenzene to be precipitated. An amount of about 9.4 grams of hexachlorobenzene was recovered by a second filtration.

The second filtrate was acidified with about 120 ml. of concentrated hydrochloric acid causing the pentachlorothiophenol product to be precipitated. This was removed by filtration, washed with water and vacuum dried. A total of about 180 grams of substantially pure pentachlorothiophenol was thereby recovered having a melting point between about 230° C. and 243° C. The yield of the reaction, based upon the amount of hexachlorobenzene initially present, was about 95.3 percent.

Example 2

About five pounds of hexachlorobenzene was added to about ten liters of pyridine and the mixture heated at about 100° C. until all of the solids were dissolved. An alkaline sulfide reagent comprised of about 725 grams of sodium hydroxide dissolved in about two liters of water and saturated with hydrogen sulfide was added over about a ten minute period to the hot pyridine solution, and the mixture agitated at 100° C. for about one hour.

The pressure on the reaction mass was reduced to about 360 mm. Hg allowing about one liter of a pyridine-water azeotrope to be distilled off at a temperature not in excess of about 60° C. The pressure was then further reduced to about 40 mm. Hg allowing about eight additional liters of the pyridine to be separated by distillation. The undistilled slurry remaining was diluted with about seven gallons of water prior to being filtered. About 0.97 pound of unreacted hexachlorobenzene was recovered in the filtration.

The filtrate was acidified to a pH between about 1 and 2 with about 8.7 pounds of concentrated hydrochloric acid solution. The precipitate which formed on acidification was allowed to stand about 48 hours before being filtered, twice washed in water and dried at about 70° C. About 4.04 pounds of product pentachlorothiophenol having a melting point of about 237°–240° C. was thereby produced.

Example 3

Five pounds of hexachlorobenzene was dissolved in 10 liters of pyridine and kept at a temperature of about 93° C. To this solution, about 4.4 pounds of a 45 percent by weight aqueous solution of sodium hydrosulfide was added within a ten minute period. A liter of benzene was added to provide an easily removable azeotrope for ridding the reaction mass of water.

The pressure on the reaction mass was reduced to about 500 mm. Hg which permitted more than a liter of the benzene-water azeotrope to be recovered. Upon further pressure reduction, about seven liters of pyridine was distilled from the reaction mass. The residue was then diluted with about four gallons of water before an additional amount of pyridine-water azeotrope was removed by continued distillation under reduced pressure.

Unreacted hexachlorobenzene was filtered off before acidifying the remaining reaction mass with about 4.84 pounds of concentrated hydrochloric acid to precipitate the product pentachlorothiophenol. About 3.49 pounds of substantially pure pentachlorothiophenol was recovered upon filtering the acidified reaction mass.

Example 4

The procedures of Examples 1, 2 and 3 were repeated excepting that a commercially available mixture of 2,3-, 2,4- and 2,5-dimethyl pyridines was substituted for pyridine in dissolving the hexachlorobenzene in pyridic solution for the reaction. Equivalent yields of substantially pure pentachlorothiophenol were realized in each instance. By way of contrast, when the procedures of Examples 1, 2 and 3 are repeated using 2,6-dimethylpyridine for dissolving the hexachlorobenzene, there is no apparent reaction and no significant yield of pentachlorothiophenol.

Example 5

The procedures of Examples 1, 2 and 3 are repeated using pentachlorotoluene in place of hexachlorobenzene. In an analogous manner, the methyl-substituted thiophenols are obtained in good yield and having substantial purity.

Example 6

A solution containing about 10 grams of sodium hydroxide in 45 ml. of ethylene glycol was saturated with hydrogen sulfide. The resulting sulfide solution was added to a hot solution of about 30 grams of pentachloroethylbenzene in 200 ml. of pyridine. The mixture was refluxed for about seven hours after which it was filtered to remove the sodium chloride which had formed during the reaction. The filtrate was cooled with ice and then slowly diluted with ice water until a total volume of about 800 ml. was attained. During the dilution, about 5.4 grams of unreacted pentachloroethylbenzene precipitated from solution and was removed by filtration.

The remaining reaction mass was again cooled with ice and then slowly acidified with hydrochloric acid to a pH of about 2. About 23.6 grams of the tetrachloroethylthiophenol which was thus precipitated was recovered by filtration. This represented about a 97 percent yield based on the quantity of unrecovered pentachloroethylbenzene. The molecular weight of the product thiophenol was found, upon electrometric silver titration, to correspond closely to the theoretical molecular weight of 277.

Example 7

About 50 grams of hexachlorobenzene was dissolved in 200 ml. of hot pyridine and maintained at about 100° C. An alkaline sulfide reagent comprised of about 50 grams of a commercial grade of sodium sulfide ($Na_2S \cdot 9H_2O$) dissolved in about 50 ml. of ethylene glycol was added to the hot pyridine solution within a period of time of about one minute. The reaction mass was heated for about 15 minutes at about 100° C. It was then filtered.

The major proportion of the pyridine and glycol was removed by vacuum distillation at about 60° C. The undistilled residue was diluted with water to a volume of about one liter. It was then acidified to pH 1–2 with concentrated hydrochloric acid. About 41 grams of pentachlorothiophenol was recovered by filtration of the acidified mass.

In contrast, a reaction mass which was prepared without employing a pyridic solvent for the polychlorobenzene contained significantly less product even when substantially higher temperatures and a greater period of time were provided for the reaction. When, for example, 46.3 grams of commercial sodium sulfide dissolved in 200 ml. of ethylene glycol were added to 50 grams of hexachlorobenzene and the mixture boiled for more than an hour (with a consequent temperature rise from 135° C. to 194° C., after about 45 minutes) only about 9.7 grams of pentachlorothiophenol was obtained.

Since certain changes and modifications in the practice of the present invention can readily be entered into without departing substantially from its intended spirit and scope, it is to be understood that all of the foregoing description be interpreted as being merely illustrative and in no sense limiting of the invention excepting as it is set forth in the appended claims.

What is claimed is:

1. Method for preparing polychlorothiophenols which comprises reacting a polychlorobenzene in pyridic solution in which the pyridine compound has at least one open position in the 2- and 6-position on the pyridine ring at a temperature between about 75° C. and about 180° C. with alkaline sulfide dissolved in a solvent selected from the group consisting of water, glycol and a saturated dihydroxy alcohol containing between three and six carbon atoms in its molecule.

2. Method for preparing polychlorothiophenols which comprises reacting a polychlorobenzene containing at least five substituent chlorine atoms in pyridic solution in which the pyridine compound has at least one open position in the 2- and 6-position on the pyridine ring at a temperature between about 75° C. and about 180° C. with an alkaline sulfide dissolved in a solvent selected from the group consisting of water, glycol and a saturated dihydroxy alcohol containing between three and six carbon atoms in its molecule.

3. The method of claim 2 wherein the polychlorobenzene is a pentachloromonoalkylbenzene having between about one and six carbon atoms in the alkyl group.

4. The method of claim 2 wherein the polychlorobenzene is pentachloroethylbenzene.

5. The method of claim 2 wherein the pyridic solution is comprised of a polychlorobenzene and a substituted pyridine having at least one open position in the 2- and 6-positions of the pyridine ring.

6. The method of claim 2 wherein the pyridic solution is comprised of a polychlorobenzene and pyridine.

7. Method for preparing pentachlorothiophenol which comprises reacting hexachlorobenzene in pyridic solution in which the pyridine compound has at least one open position in the 2- and 6-position on the pyridine ring at a temperature between about 75° C. and about 180° C. with an alkaline sulfide dissolved in a solvent selected from the group consisting of water, glycol and a saturated dihydroxy alcohol containing between three and six carbon atoms in its molecule.

8. The method of claim 7 wherein the pyridic solution is comprised of hexachlorobenzene and a substituted pyridine having at least one open position in the 2- and 6-position on the pyridine ring.

9. The method of claim 7 wherein the pyridic solution is comprised of hexachlorobenzene and pyridine.

10. Method for preparing tetrachloroethylthiophenol which comprises reacting a solution of pentachloroethylbenzene in pyridine at a temperature between about 100° C. and the boiling point with an alkaline sulfide dissolved in a solvent selected from the group consisting of water, glycol and at saturated dihydroxy alcohol containing between three and six carbon atoms in its molecule.

11. Method for preparing pentachlorothiophenol which comprises reacting a solution of hexachlorobenzene in pyridine at a temperature between about 100° C. and the boiling point with an aqueous solution of an alkaline sulfide.

12. Method for preparing pentachlorothiophenol which comprises reacting a solution of hexachlorobenzene in pyridine at a temperature between about 100° C. and the boiling point with a solution of an alkaline sulfide in glycol.

13. Method for preparing pentachlorothiophenol which comprises reacting a solution of hexachlorobenzene in pyridine at a temperature between about 100° C. and the boiling point with an amount in excess of a stoichiometric equivalent amount of a solution of an alkaline sulfide in a solvent selected from the group consisting of water, glycol and a saturated dihydroxy alcohol containing between three and six carbon atoms in its molecule.

14. The method of claim 13 wherein the alkaline sulfide is sodium hydrosulfide.

15. Method for preparing pentachlorothiophenol which comprises reacting a solution of hexachlorobenzene in pyridine at a temperature between about 100° C. and the boiling point with an amount in excess of a stoichiometric equivalent amount of an alkaline sulfide in a solvent selected from the group consisting of water, glycol and a saturated dihydroxy alcohol containing between three and six carbon atoms in its molecule; substantially isolating the product pentachlorothiophenol dissolved in a solution from the reaction mass; acidifying the dissolved pentachlorothiophenol to a pH less than about 2; then recovering the precipitated pentachlorothiophenol.

16. The method of claim 15 wherein the solvent for the alkaline sulfide is water.

17. The method of claim 15 wherein the solvent for the alkaline sulfide is glycol.

18. The method of claim 15 wherein the alkaline sulfide is sodium hydrosulfide.

19. The method of claim 15 wherein the solution of hexachlorobenzene in pyridine contains at least about 20 percent by weight of hexachlorobenzene.

References Cited in the file of this patent

UNITED STATES PATENTS

| | | |
|---|---|---|
| 1,825,662 | Hale | Oct. 6, 1931 |
| 2,591,776 | Borrows | Apr. 8, 1952 |
| 2,695,898 | Lober et al. | Nov. 30, 1954 |

OTHER REFERENCES

MacArdle: Uses of Solvents in Synthetic Organic Chemistry, 1925 Ed., D. Van Nostrand Co., New York, pp. 3, 7, 38, 39, 105, and 107–112.

Barr et al.: J. Am. Chem. Soc., vol. 72, pp. 4480–4482, 1950.